United States Patent
Sun et al.

(10) Patent No.: US 10,447,903 B2
(45) Date of Patent: Oct. 15, 2019

(54) POSITIONING DEVICE FOR ASSEMBLY OF IMAGE CAPTURING MODULE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Rui-Chien Sun, Taipei (TW); Li-Han Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 64 days.

(21) Appl. No.: 15/368,733

(22) Filed: Dec. 5, 2016

(65) Prior Publication Data
US 2018/0084165 A1  Mar. 22, 2018

(30) Foreign Application Priority Data
Sep. 21, 2016  (CN) .......................... 2016 1 0839701

(51) Int. Cl.
*H04N 5/225* (2006.01)
*B23P 19/04* (2006.01)
*G02B 7/02* (2006.01)

(52) U.S. Cl.
CPC ............ *H04N 5/2253* (2013.01); *B23P 19/04* (2013.01); *H04N 5/2257* (2013.01); *G02B 7/02* (2013.01);
(Continued)

(58) Field of Classification Search
CPC ....... H04N 5/2253; H04N 5/225; B23P 19/04; G02B 7/023; G02B 7/026; G02B 7/02
(Continued)

(56) References Cited

U.S. PATENT DOCUMENTS 4,408,830 A * 10/1983 Wutherich ............. G02B 7/004
33/1 M
4,832,452 A * 5/1989 Eisler ..................... G01M 11/04
359/813
(Continued)

FOREIGN PATENT DOCUMENTS

TW  201535006 A  9/2015
TW  201631950 A  9/2016

OTHER PUBLICATIONS

TIPO Office Action dated Apr. 20, 2017 in Taiwan application (No. 105130442).

*Primary Examiner* — Orlando E Aviles
*Assistant Examiner* — Seahee Yoon
(74) *Attorney, Agent, or Firm* — McClure, Qualey & Rodack, LLP

(57) ABSTRACT

A positioning device for the assembly of an image capturing module is provided. The positioning device includes a module fixing jig and an auxiliary positioning jig. The module fixing jig includes a positioning groove and positioning blocks disposed surrounding the positioning groove. The image capturing module and a frame are disposed in the positioning groove. The positioning blocks flexibly lean on the image capturing module and the frame. The auxiliary positioning jig is disposed on the module fixing jig. The auxiliary positioning jig includes a hollow body and an upper pressing member. The hollow body covers the periphery of the positioning groove, and has an opening exposing the image capturing module. The upper pressing member is positioned in the opening. The frame is installed on the
(Continued)

periphery of the image capturing module. The image capturing module is pressed by the upper pressing member and fixed in the frame.

9 Claims, 5 Drawing Sheets

(52) U.S. Cl.
CPC .............. *G02B 7/023* (2013.01); *G02B 7/026* (2013.01); *H04N 5/225* (2013.01)

(58) Field of Classification Search
USPC ................................. 359/811, 819; 29/281.1
See application file for complete search history.

(56) References Cited

U.S. PATENT DOCUMENTS

| | | | | |
|---|---|---|---|---|
| 5,194,993 A * | 3/1993 | Bedzyk | ................. | G02B 7/004 359/813 |
| 5,249,082 A * | 9/1993 | Newman | ................ | G02B 7/028 359/813 |
| 5,587,845 A * | 12/1996 | Goda | ................... | G11B 7/0932 359/808 |
| 6,115,166 A * | 9/2000 | Kotaki | ................... | G02B 7/003 348/E5.027 |
| 6,498,624 B1 * | 12/2002 | Ogura | ................ | G02B 13/0055 348/220.1 |
| 6,603,611 B1 * | 8/2003 | Hookman | .............. | G02B 7/008 359/811 |
| 6,657,797 B2 * | 12/2003 | Menard | ................... | G02B 7/023 359/819 |
| 7,221,524 B2 * | 5/2007 | Ye | .......................... | G02B 13/16 348/E5.027 |
| 7,559,702 B2 * | 7/2009 | Fujiwara | .............. | G02B 6/4292 385/88 |
| 7,573,651 B2 * | 8/2009 | Wei | ........................ | G02B 5/305 359/694 |
| 7,944,633 B2 * | 5/2011 | Shyu | ...................... | G02B 7/021 359/811 |
| 8,144,242 B2 * | 3/2012 | Chiang | ................ | H04N 5/2253 348/208.99 |
| 9,377,670 B2 | 6/2016 | Chan | | |
| 9,429,423 B2 * | 8/2016 | Kimura | ................ | G02B 7/003 |
| 10,095,089 B2 * | 10/2018 | Po | .......................... | G02B 7/004 |
| 2002/0154419 A1 * | 10/2002 | Shoji | ........................ | G02B 7/02 359/819 |
| 2004/0017619 A1 * | 1/2004 | Kang | ....................... | G02B 7/00 359/822 |
| 2012/0229901 A1 * | 9/2012 | Moriya | ..................... | G03B 3/10 359/557 |
| 2013/0050828 A1 * | 2/2013 | Sato | ........................ | G02B 27/64 359/557 |
| 2013/0107379 A1 * | 5/2013 | Lee | ........................ | G02B 7/023 359/811 |
| 2014/0307341 A1 * | 10/2014 | Uno | ........................ | G02B 7/08 359/824 |
| 2015/0264240 A1 * | 9/2015 | Chan | ....................... | G02B 7/102 348/208.7 |
| 2015/0277081 A1 * | 10/2015 | Hagiwara | ................ | G02B 7/09 359/818 |
| 2016/0255260 A1 | 9/2016 | Huang et al. | | |

\* cited by examiner

POSITIONING DEVICE FOR ASSEMBLY OF IMAGE CAPTURING MODULE

This application claims the benefit of People's Republic of China application Serial No. 201610839701.3, filed Sep. 21, 2016, the subject matter of which is incorporated herein by reference.

BACKGROUND OF THE INVENTION

Field of the Invention

The invention relates in general to a positioning device, and more particularly to a positioning device for the assembly of image capturing module.

Description of the Related Art

An image capturing module is mainly composed of a lens, an image sensor and a circuit board. The image sensor is disposed on the circuit board. The light image is focused on the image sensor through the lens to generate an image signal, which is further transmitted to a processor by the circuit board for analyzing the image signal of the light image.

When the image capturing module has dual lenses, the assembly tolerance includes the optical tolerance of the lens as well as the assembly tolerance between the dual lenses. Therefore, when the assembly tolerance between the dual lenses is too large, the error of the image signal will increase and affect imaging quality.

SUMMARY OF THE INVENTION

The invention relates to a positioning device for precisely positioning the image capturing module and the frame to reduce the assembly tolerance.

According to one embodiment of the present invention, a positioning device is provided. The positioning device includes a module fixing jig and an auxiliary positioning jig. The module fixing jig includes a positioning groove and a plurality of positioning blocks disposed surrounding the positioning groove. The image capturing module and a frame are disposed in the positioning groove. The positioning blocks flexibly lean on the image capturing module and the frame. The auxiliary positioning jig is disposed on the module fixing jig and includes a hollow body and an upper pressing member. The hollow body covers the periphery of the positioning groove, and has an opening exposing the image capturing module. The upper pressing member is positioned in the opening. The frame is installed on the periphery of the image capturing module. The image capturing module is pressed by the upper pressing member and fixed in the frame.

The above and other aspects of the invention will become better understood with regard to the following detailed description of the preferred but non-limiting embodiment(s). The following description is made with reference to the accompanying drawings.

DETAILED DESCRIPTION OF THE INVENTION

A number of embodiments are disclosed below for elaborating the invention. However, the embodiments of the invention are for detailed descriptions only, not for limiting the scope of protection of the invention.

Figure 1:
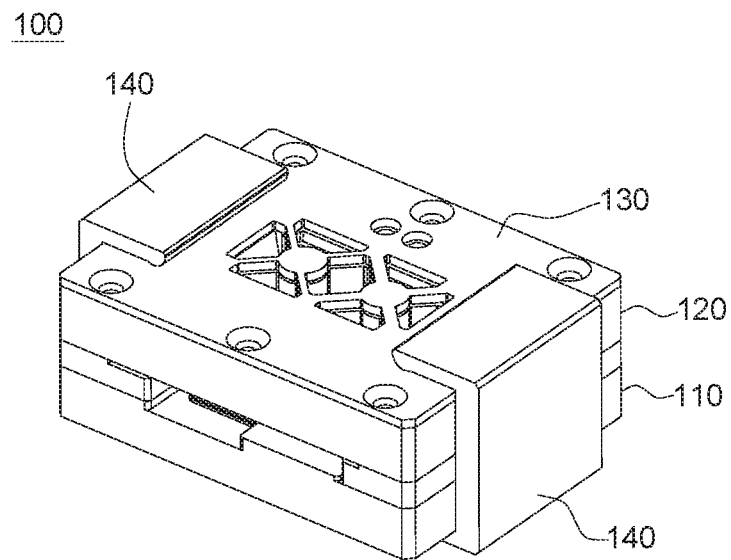
FIG. 1 is an appearance diagram of a positioning device according to an embodiment of the invention.
Figure 2:
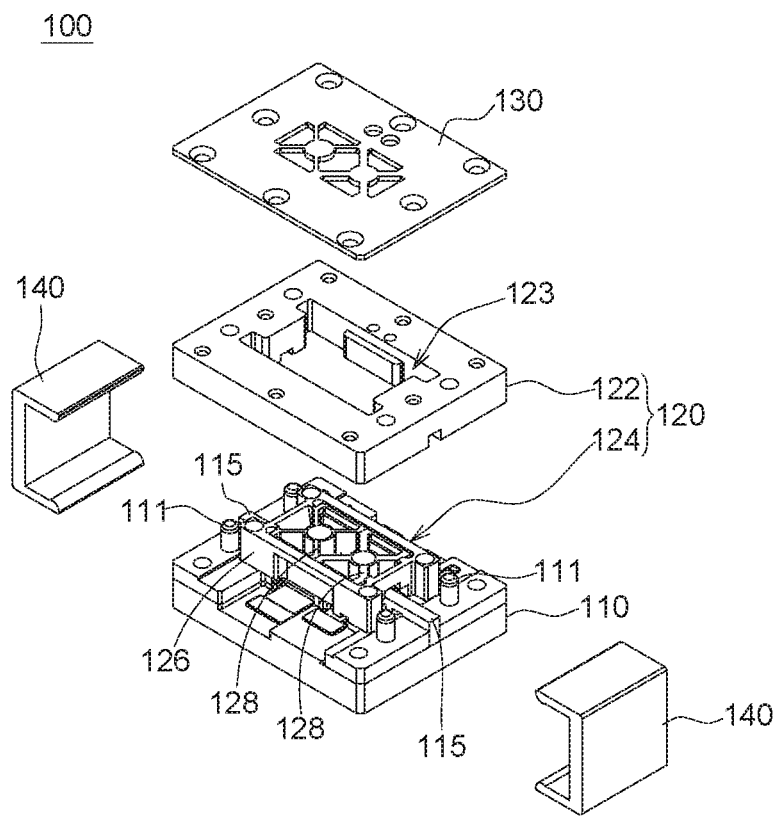
FIG. 2 is an explosion diagram of the positioning device of FIG. 1.

Refer to FIG. 1 and FIG. 2. The positioning device 100 according to an embodiment of the invention may include a module fixing jig 110, an auxiliary positioning jig 120, a binder plate 130 and a clamp 140. The clamp 140 can be a pair of U-shaped clamps. The binder plate 130 covers the auxiliary positioning jig 120. The auxiliary positioning jig 120 can be clamped between the binder plate 130 and the module fixing jig 110 by the clamp 140. The positioning device 100 of the present embodiment can fix the module fixing jig 110 and the auxiliary positioning jig 120 by using a non-clamping method (such as a locking method or an engaging method). Therefore, the clamp 140 of the above embodiment is only one of the exemplifications, and the invention is not limited thereto.

Besides, the binder plate 130 enables the clamping force to be uniformly transmitted to the upper pressing member 124 and makes the upper pressing member 124 press on the top of the image capturing module 150. Apart from using the binder plate 130 having a large coverage area to transmit the clamping force to press the image capturing module 150, the image capturing module 150 can be pressed by a clamp or a locking plate. Therefore, the binder plate 130 of the above embodiment is only one of the exemplifications, and the invention is not limited thereto. Moreover, the binder plate 130 can be regarded as a part of the upper pressing member 124 or can be integrally formed in one piece with the hollow body 122.

Figure 3:
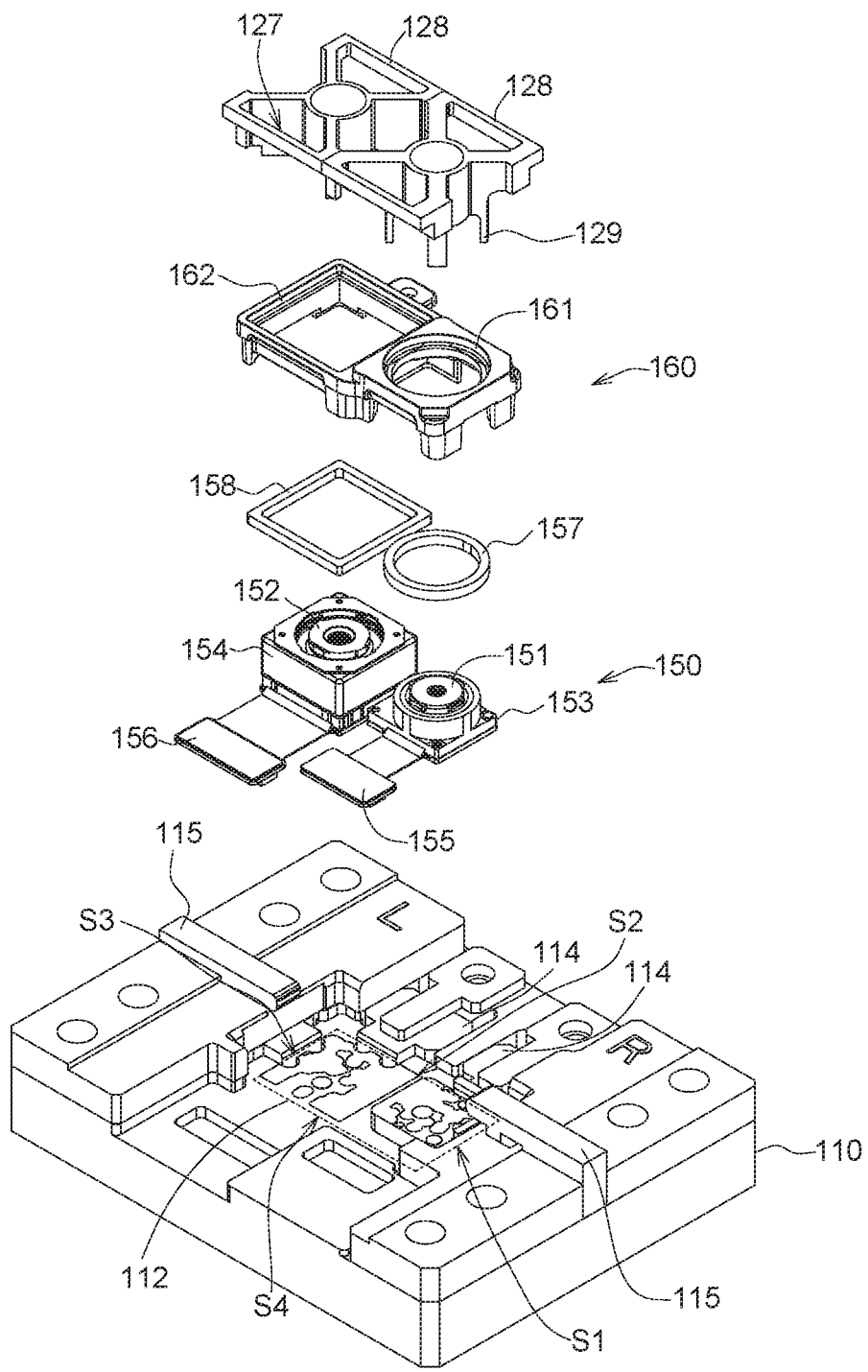
FIG. 3 is an explosion diagram of the module fixing jig and the auxiliary positioning jig of FIG. 2.

As indicated in FIG. 2 and FIG. 3, the auxiliary positioning jig 120 includes a hollow body 122 and an upper pressing member 124. The hollow body 122 covers the periphery of the positioning groove 112. The upper pressing member 124 is received in an opening 123 of the hollow body 122, and the opening 123 exposes the image capturing module 150. Furthermore, the hollow body 122 has a plurality of holes corresponding to the positioning pins 111 disposed on the module fixing jig 110, such that the hollow body 122 can be positioned on the module fixing jig 110. The upper pressing member 124 is composed of an outer frame positioning portion 126 and two inner frame portions 128. The outer frame positioning portion 126 can be fixed on the auxiliary positioning jig 120 through the module blocks. The two inner frame portions 128 are positioned in the outer frame positioning portion 126 and respectively presses the image capturing module 150, such that the image capturing module 150 can uniformly receive the force.

Figure 4:
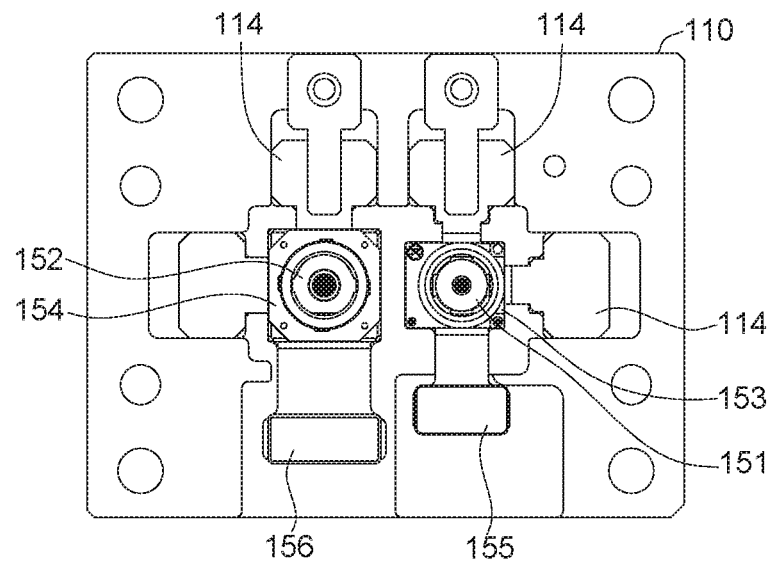
FIG. 4 is a schematic diagram of the positioning blocks of FIG. 3 flexibly leaning on two sides of an image capturing module.
Figure 5:
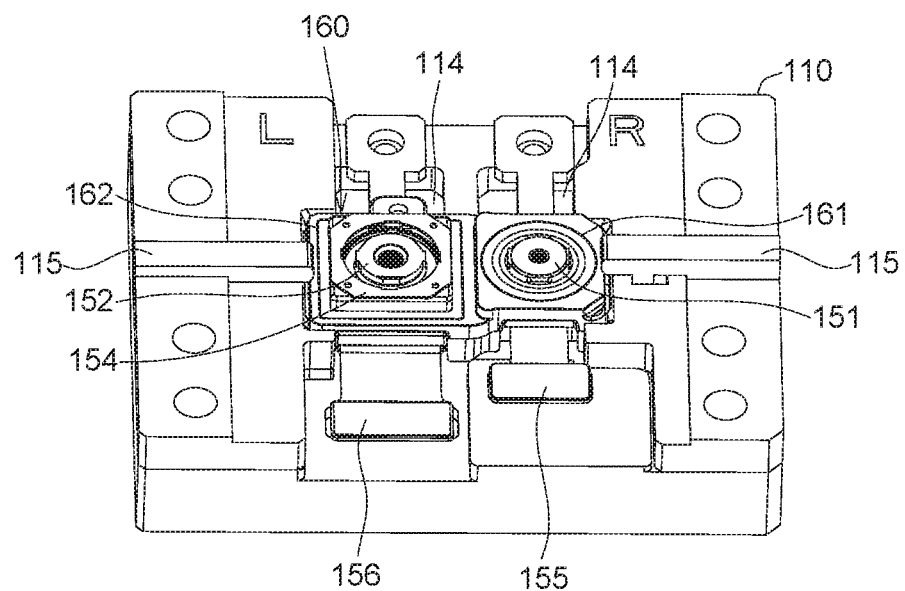
FIG. 5 is a schematic diagram of the image capturing module of FIG. 3 disposed in a frame.

Refer to FIG. 3, FIG. 4 and FIG. 5. The module fixing jig 110 includes a positioning groove 112 and a plurality of positioning blocks 114 and 115 disposed surrounding the positioning groove 112. The positioning groove 112 is integrally formed in one piece on the base of the module fixing jig 110 according to the shape and size of the image capturing module 150 and the frame 160, such that the image capturing module 150 and the frame 160 can be received and positioned in the positioning groove 112. In FIG. 3, the image capturing module 150 is a dual-lens imaging module including a first lens 151 and a second lens 152. In an embodiment, the light image can be focused on the image sensor (not illustrated) through the first lens 151 and the second lens 152 and then an image signal is transmitted to the processor (not illustrated) through the connectors 155 and 156 respectively for analyzing the image signal of the light image. To precisely position the image capturing module 150 and the frame 160 and reduce the assembly tolerance between the first lens 151 and the second lens 152, in the present embodiment, the frame 160 is installed in the periphery of the image capturing module 150 by the positioning device 100, and the first lens 151 and the second lens 152 are fixed in the frame 160 by a thermosetting adhesive. Thus, the assembly tolerance between the first lens 151 and the second lens 152 can be minimized. The assembly process of the image capturing module 150 is described below with accompanying drawings.

Firstly, refer to FIG. 3 and FIG. 4. The image capturing module 150 (the first lens 151 and the second lens 152) is disposed in the positioning groove 112, and the positioning blocks 114 flexibly lean on two sides of the image capturing module 150. The positioning blocks 114 (three are illustrated in the diagram) are adjacent to the first side S1 and the second side S2 of the image capturing module 150 and have a restoring spring (not illustrated) disposed therein. The first side S1 and the second side S2 are disposed adjacently, such that the positioning blocks 114 can apply a force to the two sides of the image capturing module 150. One end of a positioning block 114 leans on the first side S1 of the image capturing module 150 (that is, leans on the outer ring portion 153 of the first lens 151) and presses toward a third side S3 opposite to the first side S1. One end of another positioning block 114 presses on the second side S2 of the image capturing module 150 (that is, leans on the outer ring portion 153 of the first lens 151 and the outer ring portion 154 of the second lens 152) and presses toward a fourth side S4 opposite to the second side S2. Thus, the image capturing module 150 is positioned in the positioning groove 112.

Then, refer to FIG. 5. The frame 160 is disposed in the positioning groove 112. Meanwhile, the positioning blocks 114 still can pass through the frame 160 and continuously lean on the outer ring portion 153 of the first lens 151 and the outer ring portion 154 of the second lens 152. Meanwhile, the frame 160 flexibly leans on the positioning blocks 115 and is positioned on the periphery of the image capturing module 150. The positioning blocks 115 are disposed corresponding to two opposite sides of the frame 160, and have a restoring spring (not illustrated) disposed therein, such that the front end of the positioning blocks 115 can be laterally protruded above the frame 160 and press the frame 160 to avoid the frame 160 being bounced upward when the positioning blocks 114 apply a force on the frame 160. In an embodiment, the frame 160 has a first hollowed portion 161 and a second hollowed portion 162 corresponding to the first lens 151 and the second lens 152 respectively. The first hollowed portion 161 surrounds the outer ring portion 153 of the first lens 151, and the second hollowed portion 162 surrounds the outer ring portion 154 of the second lens 152.

Figure 6:
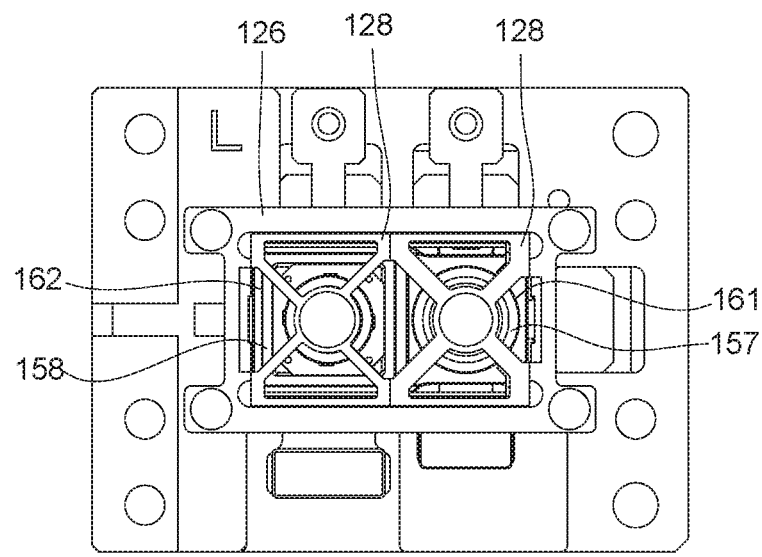
FIG. 6 is a schematic diagram of the auxiliary positioning jig of FIG. 3 disposed on the top of the image capturing module.
Figure 7:
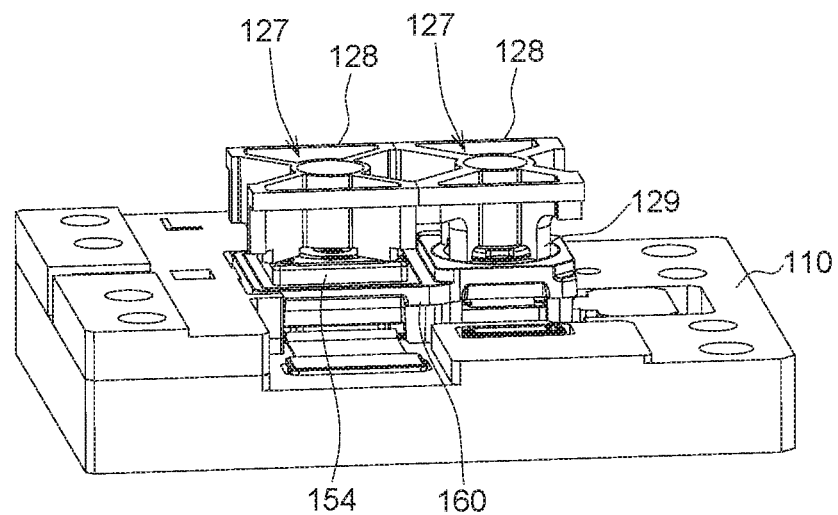
FIG. 7 is a 3D schematic diagram of the auxiliary positioning jig of FIG. 6.

Then, refer to FIG. 6 and FIG. 7. The upper pressing member 124 (the outer frame positioning portion 126 and the two inner frame portions 128) is disposed on the module fixing jig 110, and the hollow body 122 and the binder plate 130 of FIG. 2 are sequentially placed on the module fixing jig 110 and surround the upper pressing member 124, and then are clamped by the clamp 140. The two inner frame portions 128 are tightly received in the outer frame positioning portion 126. The stands 129 on the bottom of two inner frame portions 128 respectively press the outer ring portion 153 of the first lens 151 and the outer ring portion 154 of the second lens 152, such that the center of the first lens 151 and the center of the second lens 152 are respectively aligned with the centers of the two inner frame portions 128.

Additionally, the two inner frame portions 128 respectively has an injection hole 127 exposing the outer ring portion 153 of the first lens 151 and the outer ring portion 154 of the second lens 152. The dispenser can pass through the binder plate 130 and the two injection holes 127 and extend to the two inner frame portions 128 to infuse a thermosetting adhesive to the outer ring portion 153 of the first lens 151 and the outer ring portion 154 of the second lens 152. Thus, the thermosetting adhesive can be precisely dispensed on predetermined positions. Furthermore, during the dispensing process, no image sensor is required to perform calibration in advance, and calibration time can thus be saved.

As indicated in FIG. 3, the thermosetting adhesive forms two annular plates 157 and 158. When the two annular plates 157 and 158 are cured and adhered on the frame 160, the distance between the first lens 151 and the second lens 152 can be maintained to reduce assembly error (tolerance).

Figure 8:
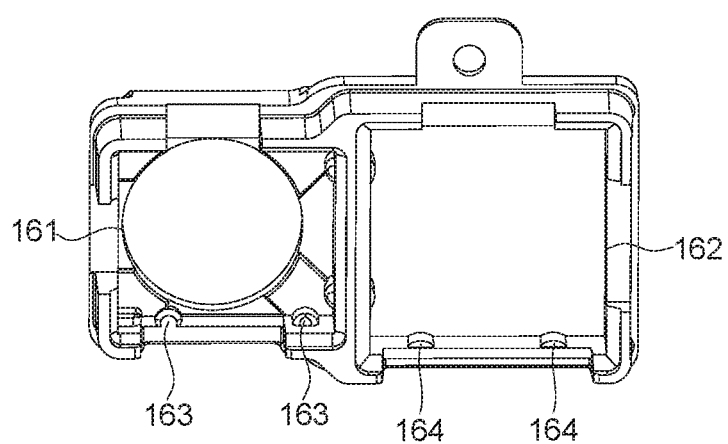
FIG. 8 is a bottom view of the frame of FIG. 3.

Then, refer to FIG. 8. A first positioning portion 163 (such as protrusion) and a second positioning portion 164 (such as protrusion) can be disposed on the sidewalls of the first hollowed portion 161 and the second hollowed portion 162. The first positioning portion 163 leans on the outer ring portion 153 of the first lens 151 and the second positioning portion 164 leans on the outer ring portion 154 of the second lens 152 to assure that the distance between the first lens 151 and the second lens 152 can be maintained and assembly error (tolerance) can be reduced.

The positioning device disclosed in above embodiments of the invention precisely positions the image capturing module and the frame to reduce the assembly tolerance (error) between two lenses. The dual-lens imaging module can capture 3D images, adjust the depth of field or have the effects of multi-apertures, zooming and ultra-wide angle, and therefore can resolve the problems encountered when single-lens imaging module is used for capturing image. When the single-lens imaging module is used for capturing images, the design of large aperture will result in an insufficient depth of field, the background or front ground of the focused object will easily become blurred. The positioning device of the invention can increase the assembly accuracy of the image capturing module and therefore increase the imaging quality of the image capturing module.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A positioning device, comprising:
   a module fixing jig, comprising a positioning groove and a plurality of first and second positioning blocks disposed surrounding the positioning groove;
   an image capturing module disposed in the positioning groove;
   a frame disposed in the positioning groove and positioned above the periphery of the image capturing module, wherein the second positioning blocks are laterally protruded above the frame and flexibly lean on the frame and the first positioning blocks pass through the frame to flexibly lean on the image capturing module; and
   an auxiliary positioning jig disposed on the module fixing jig, wherein the auxiliary positioning jig comprises a hollow body and an upper pressing member, the hollow body covers a periphery of the positioning groove, and has an opening exposing the image capturing module, the upper pressing member is positioned in the opening, and the image capturing module is pressed by the upper pressing member and fixed in the frame,
   wherein the image capturing module comprises a first lens and a second lens, and the frame has a first hollowed portion and a second hollowed portion corresponding to the first lens and the second lens respectively,
   wherein a first positioning portion is protruded from a sidewall of the first hollowed portion and a second positioning portion is protruded from a sidewall of the second hollowed portion, the first positioning portion leans on an outer ring portion of the first lens, and the second positioning portion leans on an outer ring portion of the second lens.

2. The positioning device according to claim 1, wherein the upper pressing member comprises an outer frame positioning portion and two inner frame portions, the outer frame positioning portion is disposed on the module fixing jig, the two inner frame portions are disposed in the outer frame positioning portion and respectively presses on top of the outer ring portion of the first lens and the outer ring portion of the second lens.

3. The positioning device according to claim 2, wherein the two inner frame portions respectively has an injection hole exposing the outer ring portion of the first lens and the outer ring portion of the second lens.

4. The positioning device according to claim 1, further comprising a U-shaped clamp for clamping the module fixing jig and the auxiliary positioning jig.

5. The positioning device according to claim 4, further comprising a binder plate covering the auxiliary positioning jig, wherein the auxiliary positioning jig is clamped between the binder plate and the module fixing jig by the clamp, wherein the binder plate has a through hole communicating with the opening of the hollow body.

6. The positioning device according to claim 1, wherein a plurality of positioning pins are disposed on the module fixing jig and corresponding to a plurality of holes of the hollow body.

7. The positioning device according to claim 1, wherein the first lens and the second lens are fixed in the frame by two annular plates made from thermosetting adhesive, respectively.

8. The positioning device according to claim 1, wherein two of the second positioning blocks are disposed corresponding to two opposite sides of the frame.

9. The positioning device according to claim 2, wherein a plurality of stands are formed on the bottom of two inner frame portions and the stands press the outer ring portions of the first lens and second lens.

* * * * *